United States Patent
Moshiri et al.

(10) Patent No.: US 8,850,478 B2
(45) Date of Patent: Sep. 30, 2014

(54) MULTIMEDIA SYSTEMS, METHODS AND APPLICATIONS

(75) Inventors: Negar Moshiri, Baltimore, MD (US); Frank J. Wroblewski, Gaithersburg, MD (US); Charles W. K. Gritton, Sterling, VA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 718 days.

(21) Appl. No.: 11/633,332

(22) Filed: Dec. 4, 2006

(65) Prior Publication Data

US 2007/0199022 A1   Aug. 23, 2007

Related U.S. Application Data

(60) Provisional application No. 60/741,596, filed on Dec. 2, 2005, provisional application No. 60/755,819, filed on Jan. 4, 2006.

(51) Int. Cl.

| | |
|---|---|
| H04N 5/445 | (2011.01) |
| H04N 21/472 | (2011.01) |
| H04N 21/431 | (2011.01) |
| H04N 21/482 | (2011.01) |
| H04N 21/478 | (2011.01) |
| H04N 21/426 | (2011.01) |
| H04N 21/432 | (2011.01) |
| H04N 7/173 | (2011.01) |
| H04N 21/81 | (2011.01) |
| H04N 21/462 | (2011.01) |
| H04N 21/436 | (2011.01) |
| H04N 5/782 | (2006.01) |
| H04N 21/433 | (2011.01) |
| H04N 21/4147 | (2011.01) |

(52) U.S. Cl.
CPC ..... *H04N 5/44543* (2013.01); *H04N 21/47214* (2013.01); *H04N 21/4314* (2013.01); *H04N 5/44591* (2013.01); *H04N 21/4821* (2013.01); *H04N 21/47815* (2013.01); *H04N 21/42646* (2013.01); *H04N 21/4325* (2013.01); *H04N 7/17318* (2013.01); *H04N 21/4312* (2013.01); *H04N 21/812* (2013.01); *H04N 21/4622* (2013.01); *H04N 7/17309* (2013.01); *H04N 21/43615* (2013.01); *H04N 5/44513* (2013.01); *H04N 5/782* (2013.01); *H04N 21/4334* (2013.01); *H04N 21/482* (2013.01); *H04N 21/4147* (2013.01); *H04N 21/47202* (2013.01)
USPC ............... 725/40; 725/39; 725/52; 725/58; 725/61

(58) Field of Classification Search
USPC .................................. 725/37–40, 52, 58, 61
See application file for complete search history.

(56) References Cited

U.S. PATENT DOCUMENTS

| 6,292,624 | B1 * | 9/2001 | Saib et al. ............... 386/297 |
| 6,295,646 | B1 * | 9/2001 | Goldschmidt Iki et al. .... 725/41 |

(Continued)

FOREIGN PATENT DOCUMENTS

| JP | 2005204176 A | 7/2005 |
| WO | 2005045756 A2 | 5/2005 |

OTHER PUBLICATIONS

International Search Report for PCT/US2006/046303, mailed Sep. 9, 2008.

(Continued)

*Primary Examiner* — Gigi L Dubasky
(74) *Attorney, Agent, or Firm* — Patent Portfolio Builders PLLC

(57) ABSTRACT

Systems and methods according to exemplary embodiments of the present invention provide a user interface including an electronic program guide and scrollable visual directories.

19 Claims, 16 Drawing Sheets

(56) References Cited

U.S. PATENT DOCUMENTS

| | | | |
|---|---|---|---|
| 6,400,378 B1* | 6/2002 | Snook | 715/716 |
| 6,526,577 B1* | 2/2003 | Knudson et al. | 725/40 |
| 6,549,929 B1* | 4/2003 | Sullivan | 718/102 |
| 6,640,337 B1* | 10/2003 | Lu | 725/39 |
| 6,772,433 B1* | 8/2004 | LaJoie et al. | 725/52 |
| 7,239,301 B2 | 7/2007 | Liberty et al. | |
| 7,461,343 B2* | 12/2008 | Kates | 715/716 |
| 7,631,331 B2* | 12/2009 | Sie et al. | 725/46 |
| 7,747,132 B2* | 6/2010 | Poslinski | 386/291 |
| 2002/0061185 A1* | 5/2002 | Hirabayashi et al. | 386/94 |
| 2002/0129366 A1* | 9/2002 | Schein et al. | 725/43 |
| 2002/0174430 A1* | 11/2002 | Ellis et al. | 725/46 |
| 2003/0149988 A1* | 8/2003 | Ellis et al. | 725/87 |
| 2003/0196201 A1 | 10/2003 | Schein et al. | |
| 2004/0223738 A1* | 11/2004 | Johnson | 386/83 |
| 2004/0268393 A1 | 12/2004 | Hunleth et al. | |
| 2005/0055716 A1 | 3/2005 | Louie et al. | |
| 2005/0097601 A1* | 5/2005 | Danker et al. | 725/39 |
| 2005/0097606 A1* | 5/2005 | Scott et al. | 725/52 |
| 2005/0154988 A1* | 7/2005 | Proehl et al. | 715/720 |
| 2005/0155067 A1* | 7/2005 | McKenna | 725/61 |
| 2005/0160461 A1 | 7/2005 | Baumgartner et al. | |
| 2005/0182792 A1 | 8/2005 | Israel et al. | |
| 2005/0273819 A1* | 12/2005 | Knudson et al. | 725/58 |
| 2005/0278364 A1 | 12/2005 | Kamen | |
| 2006/0176403 A1 | 8/2006 | Gritton et al. | |
| 2006/0184966 A1 | 8/2006 | Hunleth et al. | |
| 2006/0262116 A1 | 11/2006 | Moshiri et al. | |
| 2007/0035518 A1 | 2/2007 | Francz et al. | |
| 2007/0192739 A1 | 8/2007 | Hunleth et al. | |

OTHER PUBLICATIONS

Written Opinion for PCT/US2006/046303, mailed Sep. 9, 2008.

Furnas, G. W., "Effective View Navigation," Human Factors in Computing Systems, CHI'97 Conference Proceedings (ACM), Atlanta, GA, Mar. 22-27, 1997, pp. 1-8.

Supplementary European Search Report for EP 06 84 4806 dated Apr. 22, 2010.

* cited by examiner

MULTIMEDIA SYSTEMS, METHODS AND APPLICATIONS

RELATED APPLICATIONS

This application is related to, and claims priority from, U.S. Provisional Patent Application Ser. No. 60/741,596 filed on Dec. 2, 2005, entitled "Home Multimedia Environment" to Daniel S. Simpkins et al., the disclosure of which is incorporated here by reference and U.S. Provisional Patent Application Ser. No. 60/755,819, entitled "Spontaneous Navigation System", filed on Jan. 4, 2006, the disclosure of which is incorporated here by reference.

BACKGROUND

This application describes, among other things, multimedia systems, methods and applications running thereon.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds, thousands, and potentially millions of channels of shows and information. Video-on-demand technology, currently used primarily in hotels and the like, provides the potential for in-home entertainment selection from among thousands of movie titles.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface, control device options and frameworks for televisions has not changed much over the last 30 years. Printed guides are still the most prevalent mechanism for conveying programming information. The multiple button remote control with up and down arrows is still the most prevalent channel/content selection mechanism. The reaction of those who design and implement the TV user interface to the increase in available media content has been a straightforward extension of the existing selection procedures and interface objects. Thus, the number of rows in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. An example of this trend is the combination television/VCR/DVD in which three previously independent components are frequently sold today as an integrated unit. This trend is likely to continue, potentially with an end result that most if not all of the communication devices currently found in the household will be packaged together as an integrated unit, e.g., a television/VCR/DVD/internet access/radio/stereo unit. Even those who continue to buy separate components will likely desire seamless control of, and interworking between, the separate components. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. However, these attempts typically suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be speedier to traverse than list interfaces for large collections of media items, but are not readily adaptable to small collections of media items. Additionally, users tend to lose interest in selection processes wherein the user has to move through three or more layers in a tree structure. For all of these cases, current remote units make this selection process even more tedious by forcing the user to repeatedly depress the up and down buttons to navigate the list or hierarchies. When selection skipping controls are available such as page up and page down, the user usually has to look at the remote to find these special buttons or be trained to know that they even exist. Accordingly, organizing frameworks, techniques and systems which simplify the control and screen interface between users and media systems as well as accelerate the selection process, while at the same time permitting service providers to take advantage of the increases in available bandwidth to end user equipment by facilitating the supply of a large number of media items and new services to the user have been proposed in U.S. patent application Ser. No. 10/768,432, filed on Jan. 30, 2004, entitled "A Control Framework with a Zoomable Graphical User Interface for Organizing, Selecting and Launching Media Items", the disclosure of which is incorporated here by reference.

Also of particular interest for this specification are the remote devices usable to interact with such frameworks, as well as other applications, systems and methods for these remote devices for interacting with such frameworks. As mentioned in the above-incorporated application, various different types of remote devices can be used with such frameworks including, for example, trackballs, "mouse"-type pointing devices, light pens, etc. However, another category of remote devices which can be used with such frameworks (and other applications) is 3D pointing devices with scroll wheels. The phrase "3D pointing" is used in this specification to refer to the ability of an input device to move in three (or more) dimensions in the air in front of, e.g., a display screen, and the corresponding ability of the user interface to translate those motions directly into user interface commands, e.g., movement of a cursor on the display screen. The transfer of data between the 3D pointing device may be performed wirelessly or via a wire connecting the 3D pointing device to another device. Thus "3D pointing" differs from, e.g., conventional computer mouse pointing techniques which use a surface, e.g., a desk surface or mousepad, as a proxy surface from which relative movement of the mouse is translated into cursor movement on the computer display screen. An example of a 3D pointing device can be found in U.S. patent application Ser. No. 11/119,663, the disclosure of which is incorporated here by reference.

SUMMARY

According to one exemplary embodiment of the present invention, a scrollable visual directory display includes a plurality of images each associated with a selectable media item, the plurality of images arranged in a rectangular matrix with a first number of images in each row and a second number of images in each column and a scroll bar on one side of the plurality of images for scrolling said rectangular matrix.

According to another exemplary embodiment, an electronic program guide (EPG) responsive to pointing inputs and having an integrated digital video recorder (DVR) function includes a grid displayed on a display screen, the grid having a plurality of program selections displayed therein, a cursor displayed as a moveable overlay on the grid, the cursor responsive to the pointing inputs to provide random access to the plurality of program selections, and wherein when the cursor is positioned over one of the plurality of program selections, a visual indication of focus is provided to the one of said plurality of program selections; and further wherein when a selection command is received by the electronic program guide, a DVR control overlay is displayed on the grid.

According to another exemplary embodiment, a scrollable visual directory display includes a plurality of images each associated with a selectable media item, the plurality of images arranged in a rectangular matrix with a first number of images in each row and a second number of images in each column, and a scroll bar on one side of the plurality of images for scrolling the rectangular matrix.

BRIEF DESCRIPTION OF THE DRAWINGS

The accompanying drawings illustrate exemplary embodiments of the present invention, wherein.

DETAILED DESCRIPTION

Figure 1:
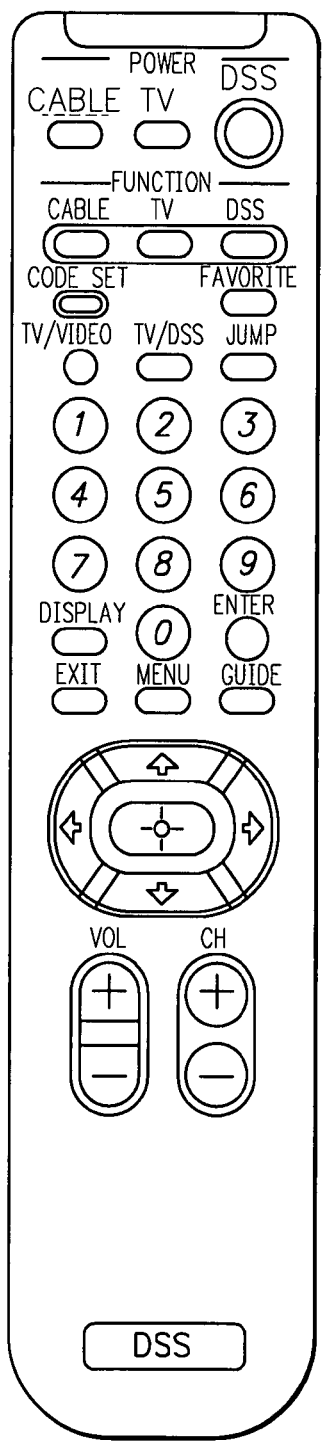
FIG. 1 depicts a conventional remote control unit for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

According to exemplary embodiments of the present invention, multimedia systems and methods provide, among other things the ability to: a) navigate entertainment choices in a way that is simple and compelling, b) unify and present disparate applications in a seamless fashion, and c) extend a consistent navigation method across many different network connected devices using, for example, standards-based protocols and networking hardware. The below-described navigation and content management systems and methods combine 3D pointing technology with a graphical presentation of content options. This approach allows, for example, consumers to select their content choices on a television screen in a manner which is similar to the way that they would use a mouse to make selections on a computer. However, this approach is much more powerful than today's operating systems because it interacts with one or more relational databases of available content, referred to below as residing on a metadata server, to help consumers browse for desired content by making recommendations to related content and products based on consumer usage and appropriate business rules. These and other features of multimedia systems and methods according to these exemplary embodiments will become more apparent upon reviewing some detailed, yet purely illustrative embodiments of system architecture (including hardware and software architecture) described below beginning with FIG. 2.

Therein, it can be seen that exemplary multimedia systems and methods provide for an open architecture 200 which is built as a modular, scalable, data-driven client-server system. This enables simple navigation of content (such as movies, music or TV shows) on hardware that resides in the consumer's home. Since the total amount of available content can be quite large (e.g., many tens of thousands of items), the total amount of relevant metadata is very large as well. In the most general case, the entire metadata set cannot be stored entirely at the client. Therefore, exemplary multimedia systems and methods are designed so that the metadata is stored at the metadata server 202 and then delivered to the client on demand. Exemplary techniques for implementing a metadata server 202, as well as for processing metadata from various databases 201 to be supplied to client devices, can be found in U.S. patent application Ser. No. 11/037,897, entitled "A Metadata Brokering Server", filed on Jan. 18, 2005 and U.S. patent application Ser. No. 11/140,885, entitled "Method and Apparatus for Metadata Organization for Video on Demand (VOD) Systems", filed on Jan. May 31, 2005, respectively, the disclosures of which are hereby incorporated by reference.

Figure 2:
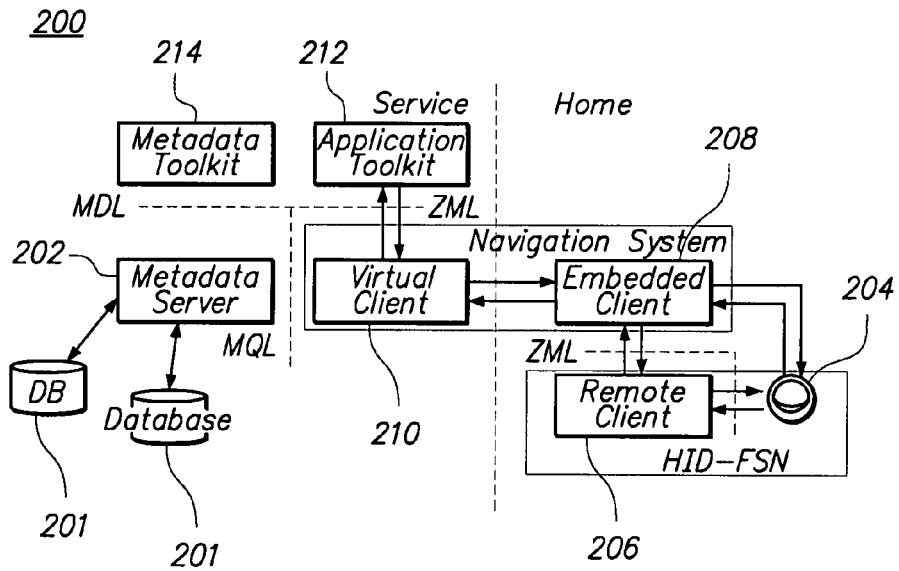
FIG. 2 depicts an exemplary multimedia system architecture according to an exemplary embodiment of the present invention.

The open aspect of the architecture 200 can best be understood by examining the interfaces shown in FIG. 2. For example, the HID-FSN (Human Interface Device for Free-Space Navigation) interface is shown on the right side of FIG. 2. According to an exemplary embodiment of the present invention, all applications are controlled by commands that come in via the HID-FSN interface from the remote control 204 to the device client 206 or embedded client 208, the latter of which is part of the navigation system software provided on the client device (e.g., a set-top box, a game console, a processor associated with a television itself or the like). The response(s) to those commands are then rendered on a display (such as a TV screen, not shown in FIG. 2) created by the client 206, 208. This user interaction drives operations in multimedia system's applications according to these exemplary embodiments, examples of which are described below.

In response to user commands conveyed over the HID-FSN interface, the client 206, 208 requests relevant metadata from the server 202 using the MQL (Metadata Query Language) interface shown in FIG. 2. After receiving the appropriate metadata in response to its MQL request, the client 206, 208 displays it in an appropriate format, e.g., on a TV screen, for the particular application which is currently being served by the multimedia system. Examples of higher level applications are provided below. Even the application itself can be parceled out on demand from the server 202. In this exemplary embodiment, a virtual client 210 is shown as part of the architecture 200. The virtual client 210 runs on the server side and manages delivery of application pieces. Those skilled in the art will recognize, however, that some client platforms are capable of housing the full application and, for such implementations, the virtual client 210 can reside on the client device, e.g., in combination with the embedded client 208. The application pieces themselves are sent from the server to the client encoded in a Zoomable User Interface Mark-up Language (ZML). Those interested in more details regarding ZML are directed to U.S. patent application Ser. No. 11/633, 325, filed on the same date as the present application, entitled "Scene Transitions in a Zoomable User Interface Using Zoomable Markup Language", the disclosure of which is incorporated here by reference.

The architecture 200 also includes data flows associated with toolkits to the server 202 and virtual client 210. These data flows occur either when new applications are created using application toolkit 212 or when new metadata sources are added to the server 202 using metadata toolkit 214. In either case, the creation of the relevant code is done offline and then published to the server. If it is a new application, it is sent to the virtual client 210 on the server in, for example, ZML format. If it is a new or modified metadata source description, it is sent in, for example, MDL (Metadata Description Language) format.

There are at least three kinds of modularity associated with multimedia systems and methods according to these exemplary embodiments. First, the techniques described herein for providing multimedia user interfaces are based on a model of the user interface as an ordered sequence of semantic interactions. Each individual interaction in a user interface is the sequence of input commands and output display responses that correspond to a particular element of a given application screen. For example, if the user interface screen includes a list box, the manipulation and display of that list box would be a single interaction. Those individual interactions within a single element are referred to herein as "semantic" because they are restricted in meaning to that specific interaction element. The entire "conversation" of the user interface across both the current screen and all application screens can therefore be seen as an ordered sequence of those semantic interactions. Exemplary multimedia systems and methods described herein use this semantic interaction model and partition applications into associated building blocks—elements referred to herein as "bricks."

Typically, television application developers either construct their software as a monolithic and integrated software application or use a markup language like HTML. In the former case, applications are highly optimized, consistent and have excellent bandwidth management. However, they are also very slow to develop, release and upgrade. In the latter case, development time is very fast but performance and consistency are not controlled very well. Distributed software construction using bricks enables multimedia systems and methods according to these exemplary embodiments to obtain the advantages of both techniques.

Bricks encompass all of the attributes and functionality associated with a particular interaction regardless of where in the overall system that interaction occurs. For example, the processing of a particular push button on a given screen can involve code in the metadata server 202 (e.g., in a query), in the virtual client 210 (e.g., the display and/or transition preparation) and in the clients 206, 208 (e.g., the display and interaction with the user). Since each element of this code is relevant to the specific interaction, it is bundled together in a single brick. Each brick then represents different types of user interactions which perform different functions. Since the functions and interactions for each brick differ in meaning from those in other bricks, each set of interactions embedded in a single brick is referred to herein as "semantic". Bundling each interaction along with other aspects of the brick, such as the graphics used on the display, makes each brick an individual design element of a user interface language. The entire application and user interface is then built by assembling bricks together in the way the application designer wants. Using bricks in this way adds repeatability and consistency to the entire application. Finally bricks provide the performance advantage of a monolithic application and the flexibility and creation advantage of an application developed with a markup language. For those interested in more details regarding bricks, U.S. patent application Ser. No. 11/325,749, filed on Jan. 5, 2006 and entitled "Distributed Software Construction for User Interfaces", is expressly incorporated here by reference.

A second aspect of modularity in multimedia systems and methods according to these exemplary embodiments is an object model that permits unique functionality required by the individual bricks to be separately organized as services associated with contextual objects in the system. This represents an abstraction of physical devices along with their associated services and permits the complete separation of specific, non-navigational functionality from the semantic interaction encapsulation of the brick system. This abstraction enables bricks to be designed and evolved separately from the object and service model. In turn, this allows for quicker and more efficient design and porting of multimedia systems and methods according to these exemplary embodiments to different platforms. Significant meta-objects associated with the object model are "visual display", "audio output", "human interface device", "timer" and "database". The visual display object handles all elements of the display. The audio output object handles all elements of audio output. The human interface device object handles all elements of cursor and command input. The timer object handles all services associated with date and time. The database object handles all aspects of persistent storage including metadata and options.

For each object, significant services include Get, Set, Subscribe and Notify. The basic operation Get returns data while its companion operation Set stores data. With these two operations, all data manipulation can be performed. The other pair of operations, Subscribe and Notify, combines to allow for event generation and monitoring. These operations allow for implementation of asynchronous events. This is a virtual abstraction that simplifies overall integration. Actual integration with a particular hardware OS and middleware can be performed at a lower level and is described below with respect to the client 206, 208. The entire non-navigational functionality of systems in accordance with these exemplary embodiments can be built up from these four basic operations on the five basic meta-objects. This simplicity and clean structure enables for better design and validation of the final system.

A third element of modularity involves the establishment of clear interfaces between system components. Each of the architectural components of multimedia systems according to these exemplary embodiments, e.g., the application and metadata toolkits (212 and 214, respectively), the metadata server 202, the virtual client 210, the client 206,208 and the 3D remote control device 204—are connected by clearly defined application programming interfaces (APIs). These APIs facilitate each architectural element's function within the multimedia system. For example, as mentioned above, the metadata toolkit 214 is used to describe new metadata sources so that the metadata server 202 can ingest them using an interface referred to herein as metadata description language (MDL). According to one exemplary embodiment, metadata description language specifies a mapping between, e.g., the XML data source and a proprietary format (MDL) that is natively recognized by the multimedia system. In more complex applications, the metadata toolkit 212 provides the application designer with the ability to specify expert rules to account for metadata exceptions and to specify links between metadata types. This linkage is what allows different applications to be tied together. For example, if a consumer is viewing information about a movie, the application may provide a link to that movie's soundtrack.

Similarly, the application toolkit 212 is used to construct applications out of bricks via a Zoomable Mark-up Language (ZML) interface, ZML being described in detail in the above incorporated by reference patent application. Multimedia systems and methods according to exemplary embodiments of the present invention provide an object-based application design method to simplify and speed up the creation of new applications. For example, an on-screen volume control would be implemented once as a brick and would be reused wherever the application designer needs to provide access to volume. Each building block then becomes part of a library that can be reused as often as desired. The result is that the user experience is easily made common across a wide range of applications. The designer uses the application toolkit 212 to customize and assemble the bricks to form new applications, which dramatically reduces the amount of time it takes to create new applications. The entire process of constructing an application can be performed in the toolkit 212. The first step is to use the brick component library to add elements to the screen at the appropriate position. The second step is to set all the options for the screen and each brick according to the application designer's wishes. The third step is to add any necessary functionality over and above the pre-defined Bricks in the embedded JavaScript associated with this scene. The fourth step is to adjust the graphics of each element and the screen itself so that the appearance of the scene is according to the application designer's wishes. The last step is to run and test the candidate screen. This can be done from within the toolkit 212 so that errors can be quickly and easily caught and corrected. Some exemplary applications are described below.

The metadata server 202 receives the required metadata from various sources, maps them to a common structure and then responds to queries from the virtual client 210. For example, as applications run on multimedia systems according to these exemplary embodiments, they send requests for specific metadata such as "the current top ten video on demand movies" to the server using the MQL (Metadata Query Language) interface. Each application in multimedia systems according to these exemplary embodiments allows the user to view and browse specific metadata which, as described above, is information about the various content choices available to the consumer. For example, as described below, a TV application manipulates metadata about movies or TV programs and then allows the consumer to watch selected content that the metadata describes. According to exemplary embodiments, it is anticipated that the metadata neither comes from one source nor is entirely accurate or complete. Therefore, a significant aspect of the overall experience associated with these multimedia methods comes from gathering, correcting, and linking or connecting the available metadata in the relational database on the metadata server 202. The following sections describe four functions of the server 201: adaptation, aggregation, queries and cross-link generation.

One important operation of the metadata server 202 is to obtain new and/or updated metadata from external sources. This process is referred to herein as "adaptation" since its main function is format adaptation. A complete adaptation process can also include normalization and validation. The normalization process provides for putting all metadata in a standard format so that it can be used by the applications. The validation process insures that the metadata is correct. The result is a dataset that feeds the aggregation process. Typically, all of the metadata needed to run a complete system does not come from a single source. Therefore, another function of the metadata server 202 is to aggregate the various underlying sources together. The result is a more complete and accurate dataset which allows for better navigation. Metadata sources include both third party metadata licensors as well as the individual users themselves. For example, the names of all photos in a consumer's photo library would constitute a metadata source.

The metadata consolidated in the database is accessed by the various applications of multimedia systems and methods according to queries posed by the virtual client 210. Multimedia systems according to exemplary embodiments can support a complete query language that allows for full, parameterized construction of the retrieval criteria needed by the application developer. Both searching and sorting are offered as primitive services. Yet another function of the metadata server 202 is to generate cross-linking (special connections) across the metadata. In order to do this, multimedia systems according to these exemplary embodiments can be designed to filter, validate and normalize the ingested metadata and then use inference and matching rules. The result is a rich, cross-linked metadata set that enables seamless browsing both within and across categories of metadata. For example, the user can examine the content related to the movie Independence Day, see that Will Smith starred in it, and notice that Smith produced a record album called Born to Reign. In this hypothetical example, the consumer starts at a movie and browses seamlessly through music and even into commerce if the service offers a way to buy content or related products.

The device client 206, 208, 210 is in communication with the metadata server to generate user interfaces in accordance with these exemplary embodiments. According to one exemplary embodiment, the virtual client 210 builds the full application set and handles the data delivery to the remote portions 206, 208 of the device clients. In such embodiments, the client software 206, 208 processes the basic semantic interactions with the end user and requests assistance as needed from the virtual client 210. The virtual client 210 preferably resides on the same hardware platform as the rest of the device client software 206, 208 but may reside separately if required, e.g., due to client hardware with relatively fewer processing resources.

Regardless of whether the device client software is split between the server side and the client side or not, it runs the applications in multimedia systems and methods according to these exemplary embodiments and also runs any services, such as a personal video recorder (PVR) service, that are used to support those applications. Some features of the device client 206-210 include visual presentation, spatial structure, semantic zooming, and low latency. Regarding visual presentation, since people can process an entire visual screen in about the same time it takes to process seven to ten words, user interfaces according to exemplary embodiments make large use of images as selectable media objects. In multimedia systems having, e.g., tens of thousands of content items to choose from, using images to obtain this extra cognitive efficiency is beneficial. Additionally, these exemplary embodiments provide a spatially-organized user interface that users find easier to navigate and locate items. The result is that overall performance for content selection can be twice as fast as when a consumer uses plain image maps, e.g., without spatial connections between scenes.

All visual, spatial user interfaces are not necessarily ideal for displaying, e.g., multimedia content selection choices. If not properly designed, such user interfaces can easily result in information overload. Effective navigation with large amounts of content can be implemented by considering, for example, the following constraints: constrained out-degree from any given point (small views), small diameters (short paths), good residue at connected nodes and small outlink information (interlocking sets with shared residue) as described by, for example, George W. Furnas in his article "Effective View Navigation", *Human Factors in Computing Systems*, CHI'97 Conference Proceedings (ACM), Atlanta, Ga., Mar. 22-27, 1997. Semantic zooming according to exemplary embodiments provides a solution to all of these constraints. The user is presented only with information that is semantically relevant to him or her at that instant and that information is presented with the appropriate detail to make it useful. Combined with effective cross-linking as performed by the metadata engine, user interfaces that transition between scenes using semantic zooming provides a complete navigation solution. For example, when a list of images is shown, the user can receive an overlay of textural titles by moving the cursor over the selected picture.

Figure 3:
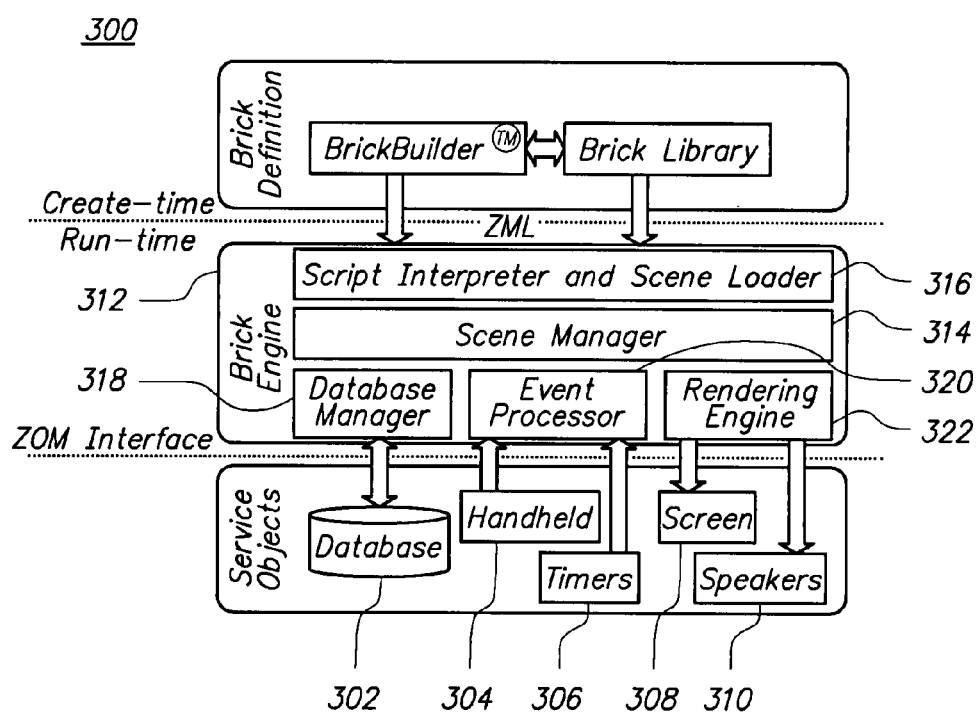
FIG. 3 shows an exemplary device client software architecture according to an exemplary embodiment of the present invention.
Figure 4:
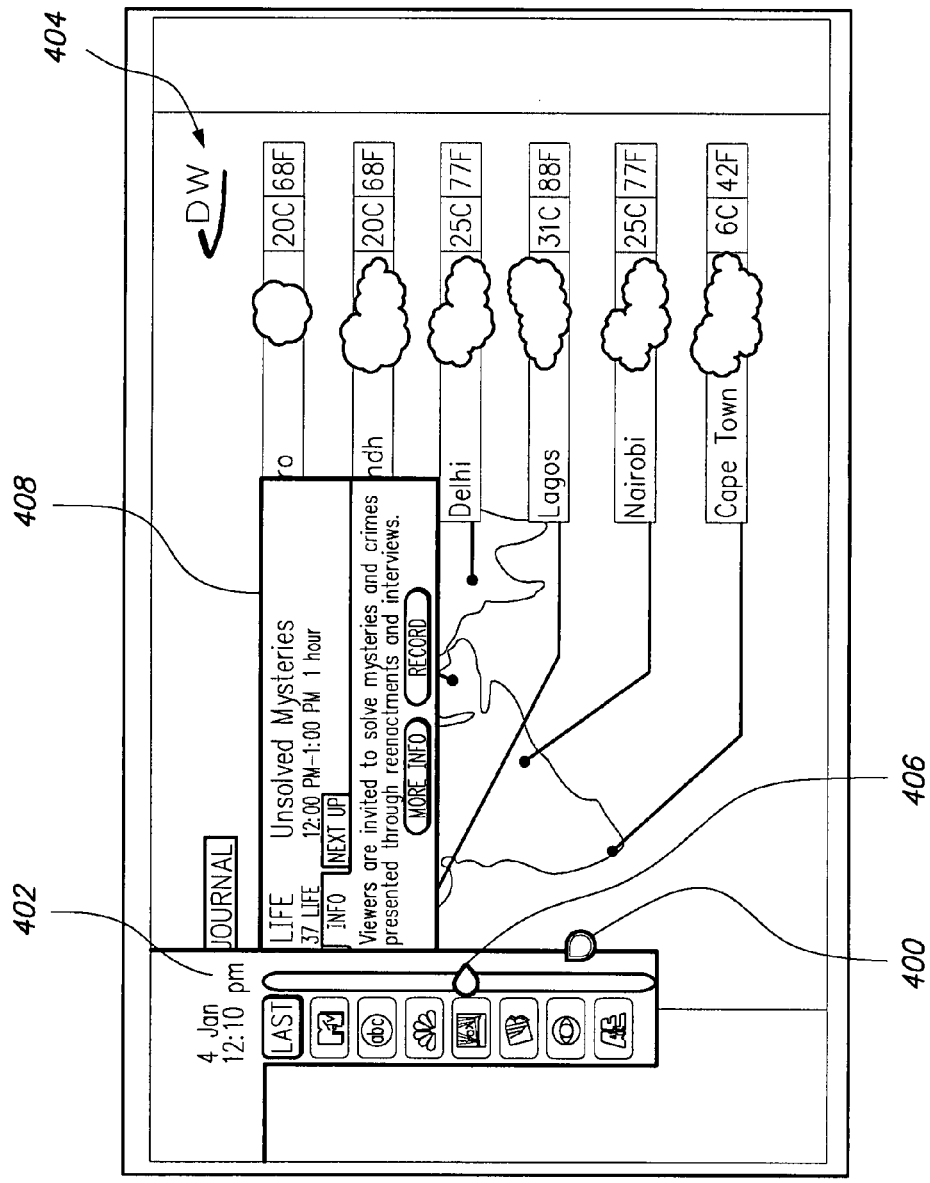
FIGS. 4-11 illustrate scenes from a live TV application according to an exemplary embodiment of the present invention.

Lastly, exemplary embodiments contemplate that a visual user interface with poor latency performance may be perceived as inferior than a user interface that is solely or primarily text-based, but which has better latency performance. Accordingly, techniques to improve latency in a visual system by the device client are also contemplated according to these exemplary embodiments. For example, one method for reducing latency according to these exemplary embodiments is to use the transitions associated with the zooming interface to mask long latency operations. Transitions also allow the user to preserve spatial awareness and context so that she or he is never lost while navigating the application interface. An exemplary client architecture 300 for providing a user interface having the afore-described characteristics is illustrated in FIG. 3.

Therein, at the bottom of the figure, are the meta-service objects of the platform which, together, form a zoomable user interface object model (ZOM). Specifically, these meta-service objects include a database object 302, a handheld device object 304, a timers object 306, a screen object 308 and a speakers object 310. An API boundary is provided between the client run-time software 312 and the middleware and services 302-310 provided by the platform itself. Thus the client run-time software 312, shown in the middle region of FIG. 3, provides for the core event loop in the system. Various subroutines/functions are provided in the client run-time software 312 to interact with the service objects. For example, a database manager 318 interacts with the database object 302, an event processor 320 interacts with the handheld object 304 and timers object 306, while the rendering engine 322 interacts with the screen object 308 and the speakers object 310. The client run-time software 312 also includes a scene manager 314 which keeps track of the current camera view of the entire zoomable user interface. The scene manager 314 is also responsible for adjusting the camera view according to either user events (such as the pointer moving or a button press) or external ones (such as the phone ringing or a timer expiring). More information regarding camera views associated with exemplary ZUIs can be found in the above-incorporated by reference U.S. patent application Ser. No. 10/768,432. The scene manager 314 calls upon the scene loader 316 as appropriate to navigate to another part of the ZUI (new scene) via the ZML interface. According to some exemplary embodiments, even though the full spatial world associated with the ZUI exists at creation time, it is only brought into the client's view as needed over the ZML interface. This allows for efficient memory utilization by the client. As mentioned above, bricks can be defined by a toolkit and stored in a brick library as shown in FIG. 3.

Of course the applications which run on top of the various architectures described herein are a significant part of the entertainment system because they are the means that consumers use to get access to the content and services they want to consume. According to exemplary embodiments, each application is designed to provide a specific type of entertainment, information or communications function to make it easy for integrators to create products that are unique and aligned to their business interests. As described above, one advantage of multimedia systems in accordance with these exemplary embodiments is that new applications can be created using the visual development system toolkit. Three exemplary applications are described below: (1) a television application, (2) a media application, and (3) a shopping application.

According to exemplary embodiments of the present invention, the applications available in these multimedia systems are launched through a portal or menu screen. The portal contains, for example, icons for each system application. In addition, the application framework can provide on-screen navigation buttons, which reside on the portal and all navigation pages. According to one exemplary embodiment, these navigation buttons include a home button, a search button, a go up one level button, and a live TV button. The home navigation button takes the consumer back to the top screen of the portal regardless of their location in the application worldview. The search navigation button is used to help users find desired content. According to some exemplary embodiments, it allows text entry and presents results visually. Each application is a set of sub-functions organized in a hierarchy. The go up one level button takes the consumer up to the main level in the current sub-function. Lastly the live TV button takes the consumer to the Live TV screen associated with the TV application described next below. The channel viewed is the last one selected. For the reader interested in more details and other examples relating to navigation buttons and an exemplary portal, she or he is directed to U.S. patent application Ser. No. 11/437,215, filed on May 19, 2006, entitled "Global navigation Objects in user Interfaces, the disclosure of which is incorporated here by reference.

As mentioned above, one application associated with exemplary embodiments is a TV application that manages the television watching experience. This application represents the basic functionality of today's living room applications—linear television, video-on-demand (VOD) and digital video recording. An exemplary TV application which can be run on the afore-described hardware/software architecture can include the following features.

Live TV—Viewing live TV is an important aspect of many multimedia systems and applications. According to these exemplary embodiments, users are freed from strict linear timetables with digital controls like pause, fast forward and rewind. This feature lets consumers receive a phone call or use a bathroom without missing any of their favorite show or sportscast. They can skip over parts they don't want to see or rewind to see important scenes again. The Live TV function also offers a new type of on-screen control that makes changing channels a snap even in an environment with several hundred TV channels and thousands of video on demand options. The consumer can point-and-click at the desired choice and is free from the cumbersome up-down-left-right approach of today's remote controls. Available Live TV features include volume and channel adjustment, ad banners, rewind and fast forward controls, and play and pause. In addition, some exemplary embodiments of live TV applications indicate show progress and, if available, includes linkages to other related content and services.

Consider, in this regard, the exemplary user interface screens of FIGS. 4-11 which illustrate portions of an exemplary live TV application. The user interface screen illustrated in FIG. 4 can, for example, be accessed by selecting and actuating the live TV button from the home portal described above. Therein, moving a cursor 400 over a left portion of the display screen invokes a channel control overlay 402 which is superimposed over a live video feed 404. In this exemplary embodiment, the channel control overlay 402 includes a channel bar with a movable selector 406. The movable selector 406 can be dragged up and down the channel bar and its current location along the channel bar indicates which channel has the focus of the interface. In this example, the location of the movable selector 406 along the channel bar is such that channel 37 has the focus, resulting in a supplemental information overlay 408 being displayed over the live TV feed 404. Alternatively, the movable selector 406 (slider) can be controlled by, for example, rotating a scroll wheel on a pointing device or a 3D pointing device (handheld controller) which is in communication with the multimedia system. To the left of the channel bar are a number of rectangular icons representing favorite channels or networks which can be selected for display on the live TV feed 404 by, e.g., pointing and clicking thereon.

Figure 5:
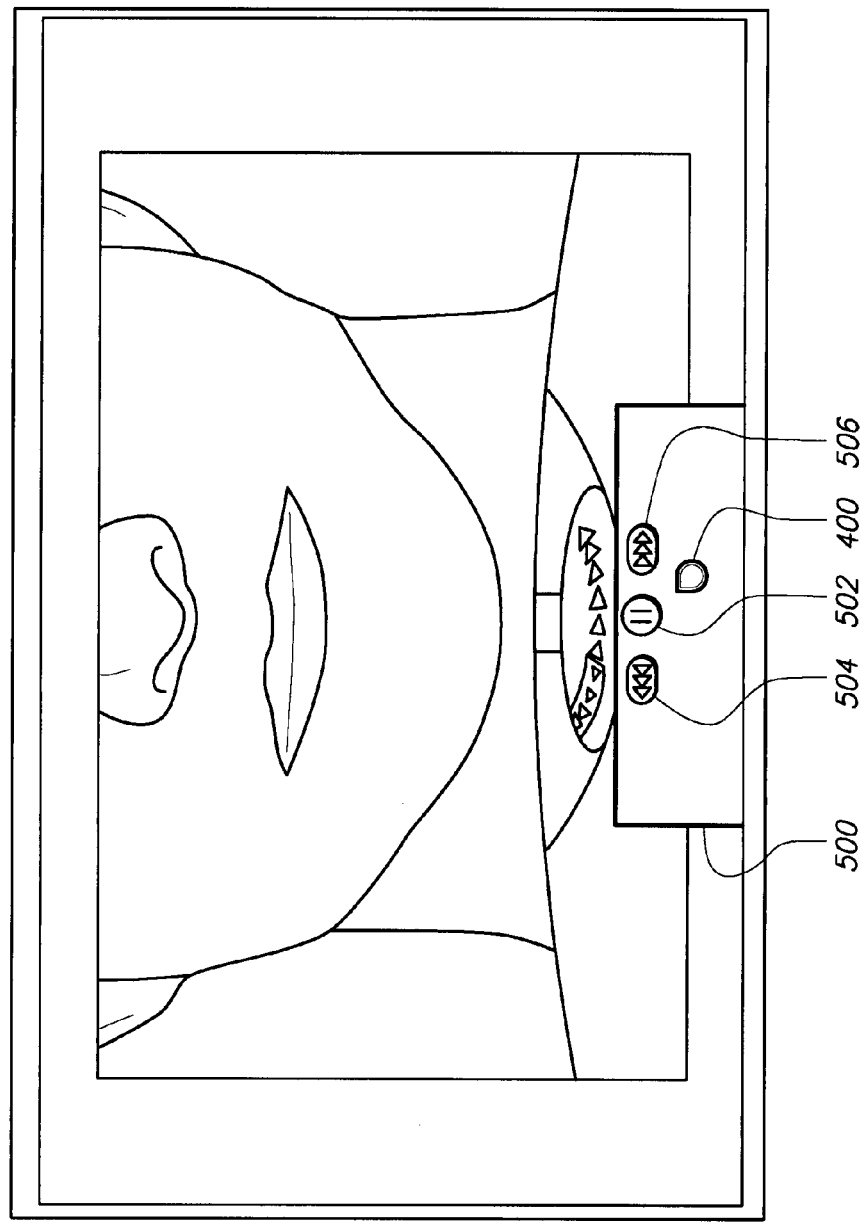
Figure 6:
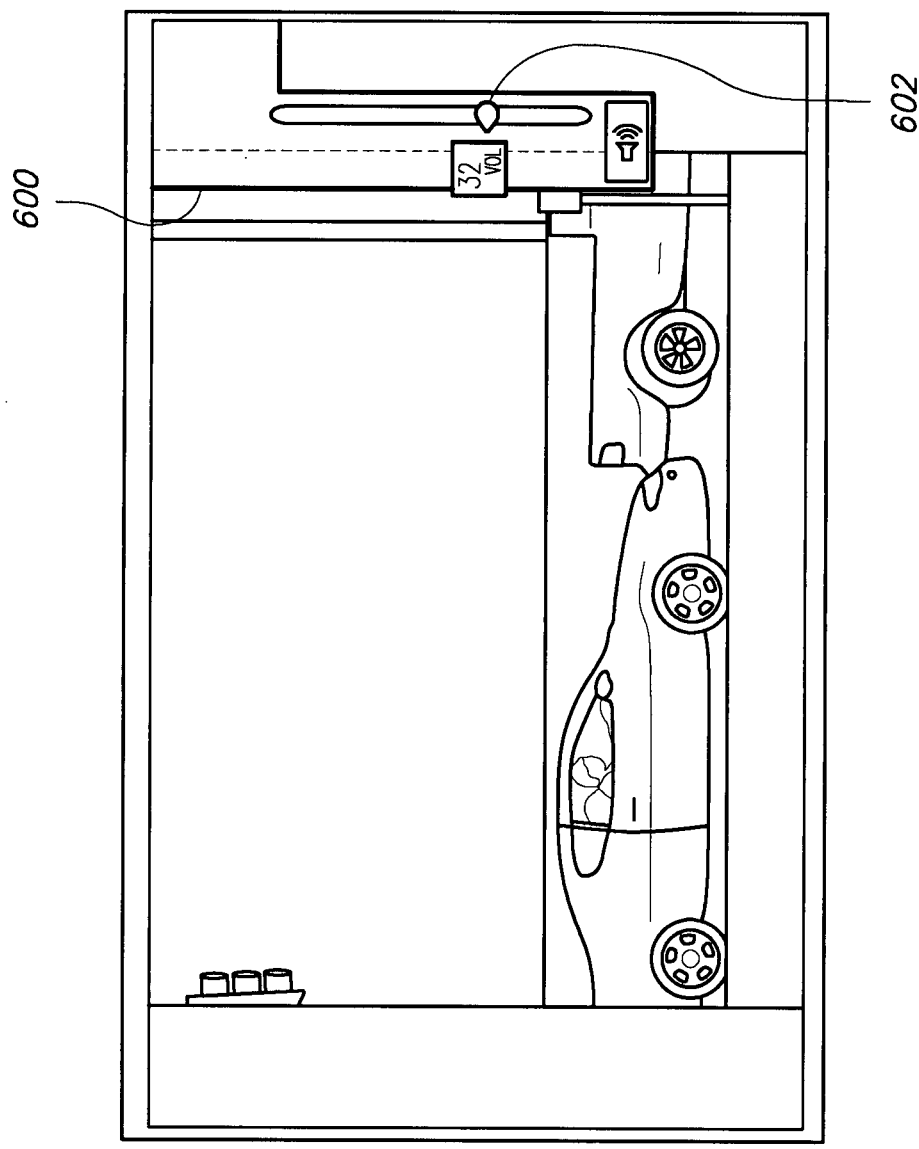
Figure 7:
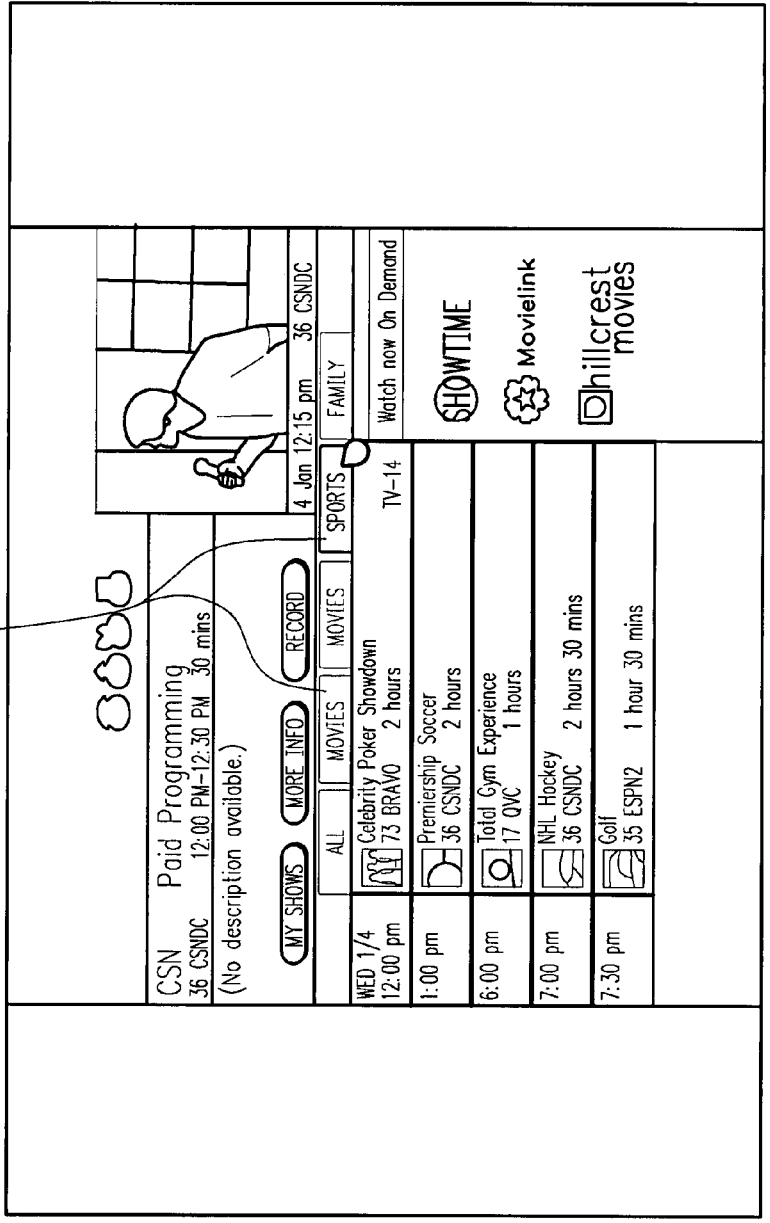

If, for example, the cursor 400 is moved to the bottom portion of the screen, a DVR control overlay 500 can be invoked as shown in FIG. 5. Therein, pause 502, rewind 504 and fast-forward 506 controls can be displayed and actuated by, e.g., pointing and clicking on the desired DVR control while they are being displayed over the live TV feed. Similarly, a volume control overly 600 (see FIG. 6) can be displayed when, for example, a scroll wheel is depressed on the pointing device or 3D pointing device used as a remote control. Thereafter, in response to rotating the scroll wheel up or down, the volume can be increased or decreased and the slider 602 will be displayed on the screen as moving up or down to reflect the change in volume.

The live TV application can also include a guide which features a program grid that is enhanced with by 3D pointing capabilities of these exemplary embodiments. This new interaction approach increases the value of the traditional EPG because it offers random navigation of each grid element (using the pointing metaphor). It also provides fast access to content metadata and services. The guide and channel banner have built-in content and service linkages that further enhance the value of the guide. The digital video recorder (DVR) and on-demand content services are tightly integrated within the guide and include a robust search and filter mechanism, which works across all types of programming whether linear, on-demand or recorded. Other features include user selected favorites, reminders, filters, and linkages. An example is shown as FIG. 7, wherein these features and others, e.g., filters 702 re "Movies" or "Sports" enable a user to easily filter the available guide selections being played by pointing and clicking on the associated tabs.

Figure 8:
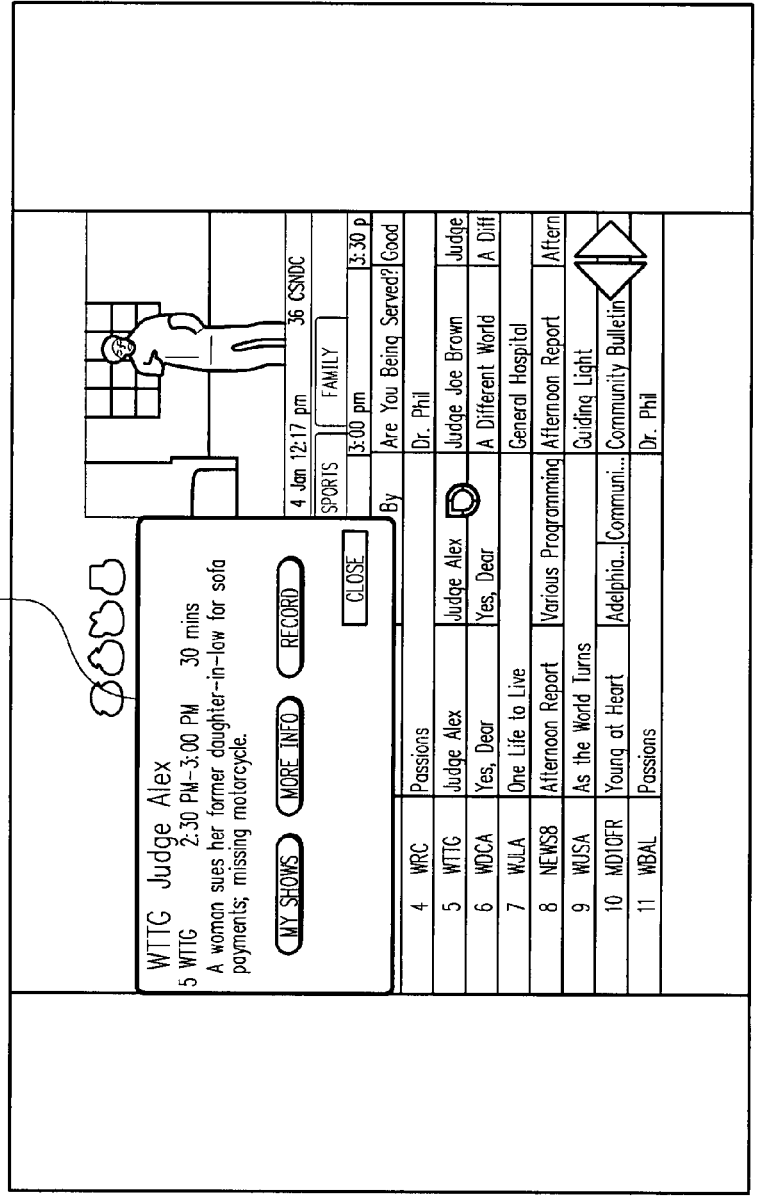
Figure 9:
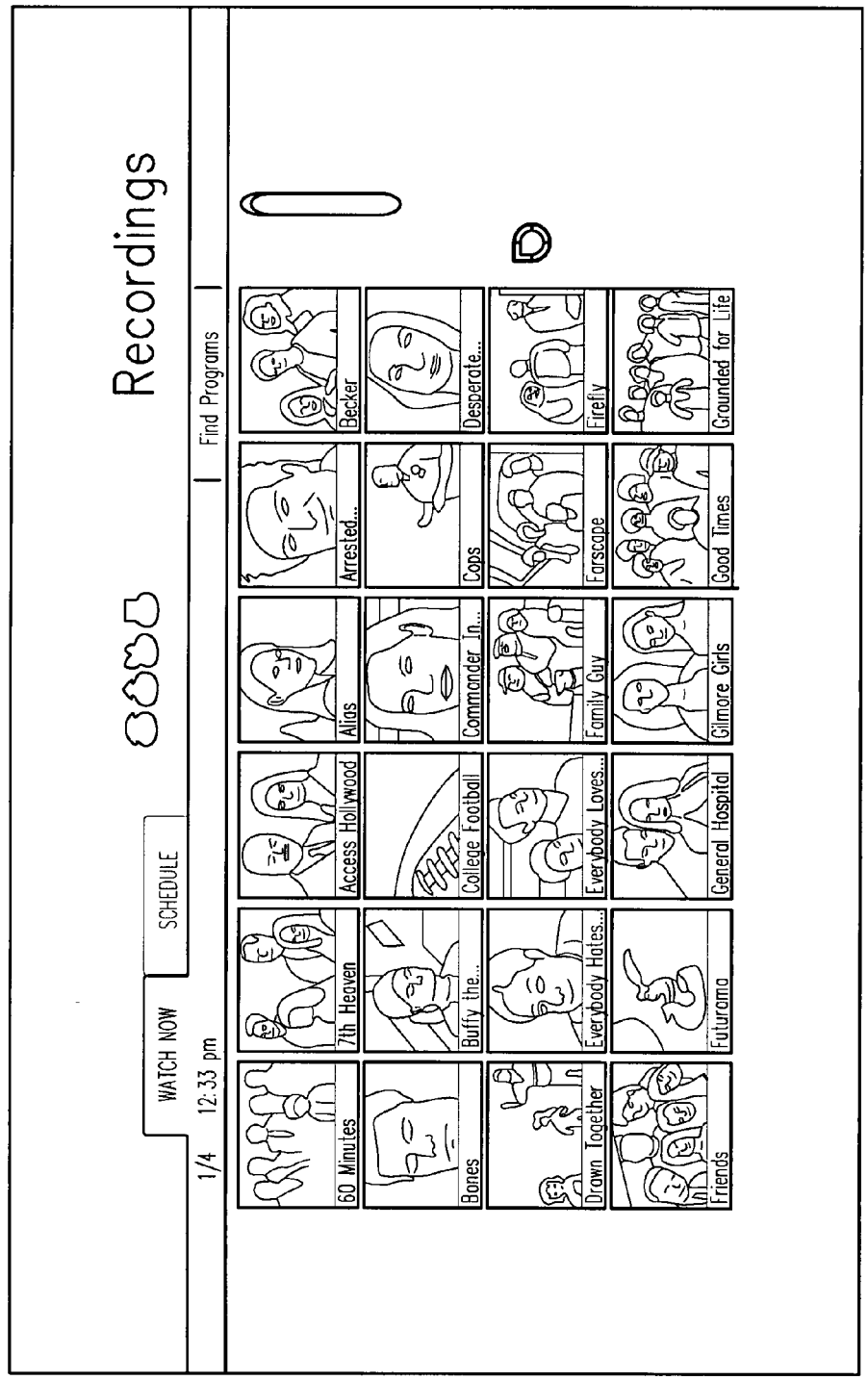
Figure 10:
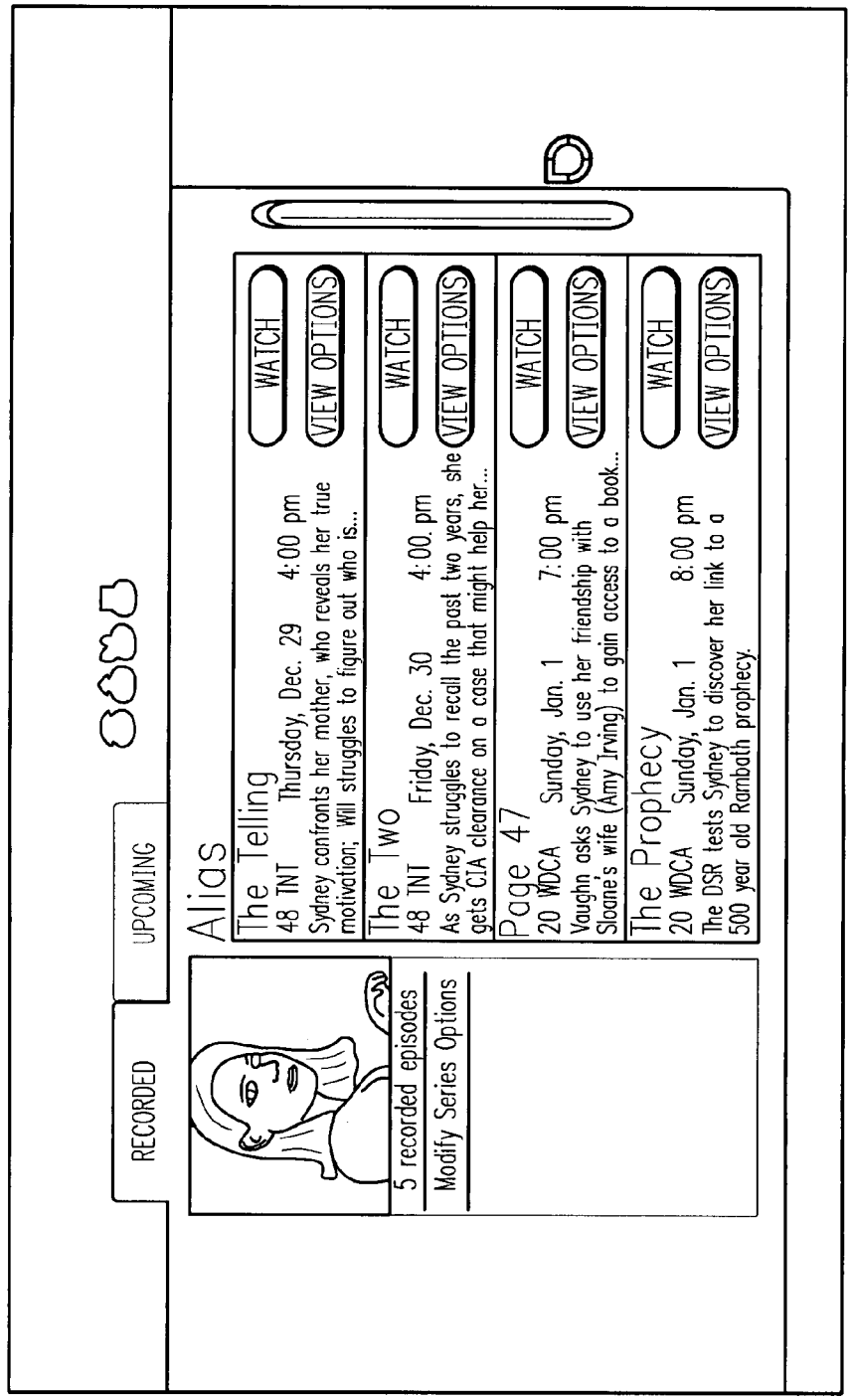

Unlike other guides that present the DVR function as a separate and standalone application, this exemplary live TV application integrates the DVR into the guide itself. Recorded programming and services to schedule a program recording are always just a few clicks away. This feature eliminates complex hierarchies to access DVR services. DVR features include record, play (with progress bar), delete (priority-based), recorded schedule, display of space available, sort, filter, conflict resolution, and watch while record. This integration enables the user to, for example, look for something to watch within the guide portion of the live TV application and to decide (without changing scenes in the ZUI) to record that show since it is on later, as shown in FIG. 8. Therein, selection of the entry "Judge Alex" within the guide at a time (2:30 pm) which is later than the current time results in a DVR overlay being displayed directly on the guide, i.e., without taking the user to another ZUI scene. In this example, the DVR overlay 800 includes some information about the selected TV show plus three selectable options—"My Shows", "More Info" and "Record" any of which can be pointed to and selected. Selecting the "Record" button in overlay 800 will result in the selected show being queued for recording by the multimedia system. Selecting the "My Shows" button in the overlay 800 will provide the user with a browsable listing of all of his or her shows which have been recorded (as well as those scheduled to be recorded) using, e.g., a visual directory of images, an example of which is illustrated in FIG. 9. Note that this exemplary visual directory is scrollable vertically by use of the scroll bar provided to the right of the matrix of images. However, according to other exemplary embodiments, horizontal scrolling could be supported by providing a scroll bar above or below the matrix, either together with or as an alternative to vertical scrolling. Selecting one of the TV shows which have been recorded to view more details can be accomplished by pointing at and clicking on a corresponding TV show image. For example, selecting the TV show image of "Alias" might result in the ZUI screen shown in FIG. 10 which provides ready access to recorded episodes as well as a schedule of upcoming episodes scheduled to be recorded.

Yet another feature of the live TV application according to these exemplary embodiments is the use of visual directories for on-demand services. The visual directories offer the consumer the same experience as when they walk into a video store. They can see many movie covers organized into appropriate categories, thereby providing an approach that effectively scales with the breadth of available content. According to some purely exemplary embodiments, a zoomable Visual Directory™ shows as many as 128 titles per screen and can scale using the pan and scroll features to support thousands of titles in a simple to use structure. The information structure of the Visual Directory™ flattens the hierarchy of total available options and, using linkages, supports the various methods that consumers use to search for content. They can search directly or they can browse through categories or use links embedded in the listings to improve access to a wide range of content choices. VOD features according to these exemplary embodiments include scaling, filters, sorting, pay-per-view, and rental management.

Figure 11:
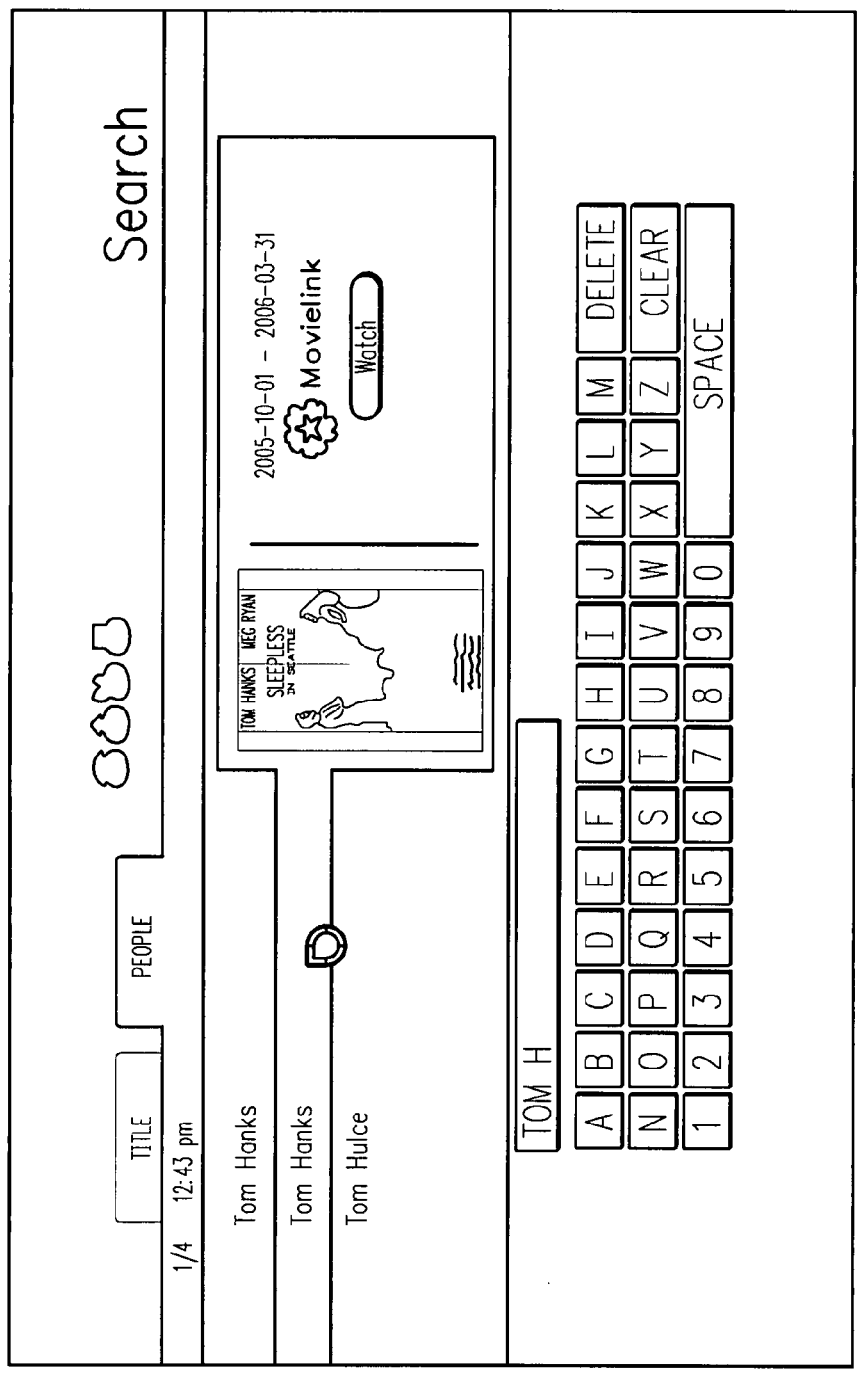

Still another feature of the live TV application is a search capability. Sometimes consumers know precisely what media content they would like to consume, in which case a direct search may be more appropriate than browsing. Thus, according to these exemplary embodiments, a live TV application can include a search function (reachable by, among other techniques, a global navigation button as described above) from which users can search for specific content using keywords, names, titles and date or time information. The search system provides filtered results from TV listings, the DVR manager, and video on demand database. To simplify the user experience, the consumer can easily point at the desired search result in a visual list of options. For text based search, predictive methods are employed to minimize the number of "free-space operations" required to enter the desired request. An example of this latter type of search is shown in FIG. 11 wherein a user is trying to determine if any movies having Tom Hanks as an actor are playing on available VOD selections.

Having described an exemplary live TV application according to an exemplary embodiment of the present invention, a second exemplary application which can be run on the afore-described architectures is a media application. According to these exemplary embodiments, a media application can provide a comprehensive suite of personal multimedia content navigation and media management applications including music, photos and home videos that directly address convergence in the home. This exemplary media application organizes digital media content from a consumer's personal collection (e.g., on a Personal Computer or other networked device) and integrates this content delivered by a service provider (over a broadband connection) to present all available digital media in a consistent user interface on the TV. Among other things, this exemplary media application provides for the creation of photo slide shows wherein users can point-and-click on their favorite photos to create instant slide shows displayed on their televisions. Custom playlists of music can be readily created by applying the Visual Directory™ to a user's personal music collection. Similarly, whether the user wants easy access to video clips delivered by a service provider or those clips previously downloaded to a personal computer, a simple point-and-click creates a custom video playlist for playback to the TV. For the reader interested in more detail regarding these and other aspects of an exemplary media application (as well as the afore-described live TV application and the below-described shopping application), she or he is referred to U.S. patent application Ser. No. 11/354,329, entitled "Methods and Systems for Enhancing Television Using 3D Pointing", filed on Feb. 14, 2006, the disclosure of which is incorporated here by reference.

Yet another type of application which can be provided to run on the afore-described architectures is a shopping application. According to exemplary embodiments of the present invention, an interactive shopping application is created that provides the experience of a virtual mall on TV which allows consumers to shop in a comfortable and secure setting while providing a community aspect to the experience. This shopping application leverages the metadata created for online shopping destinations and reformats this information to present it in an interactive and visually appealing manner that is optimized for the TV.

Figure 12A:
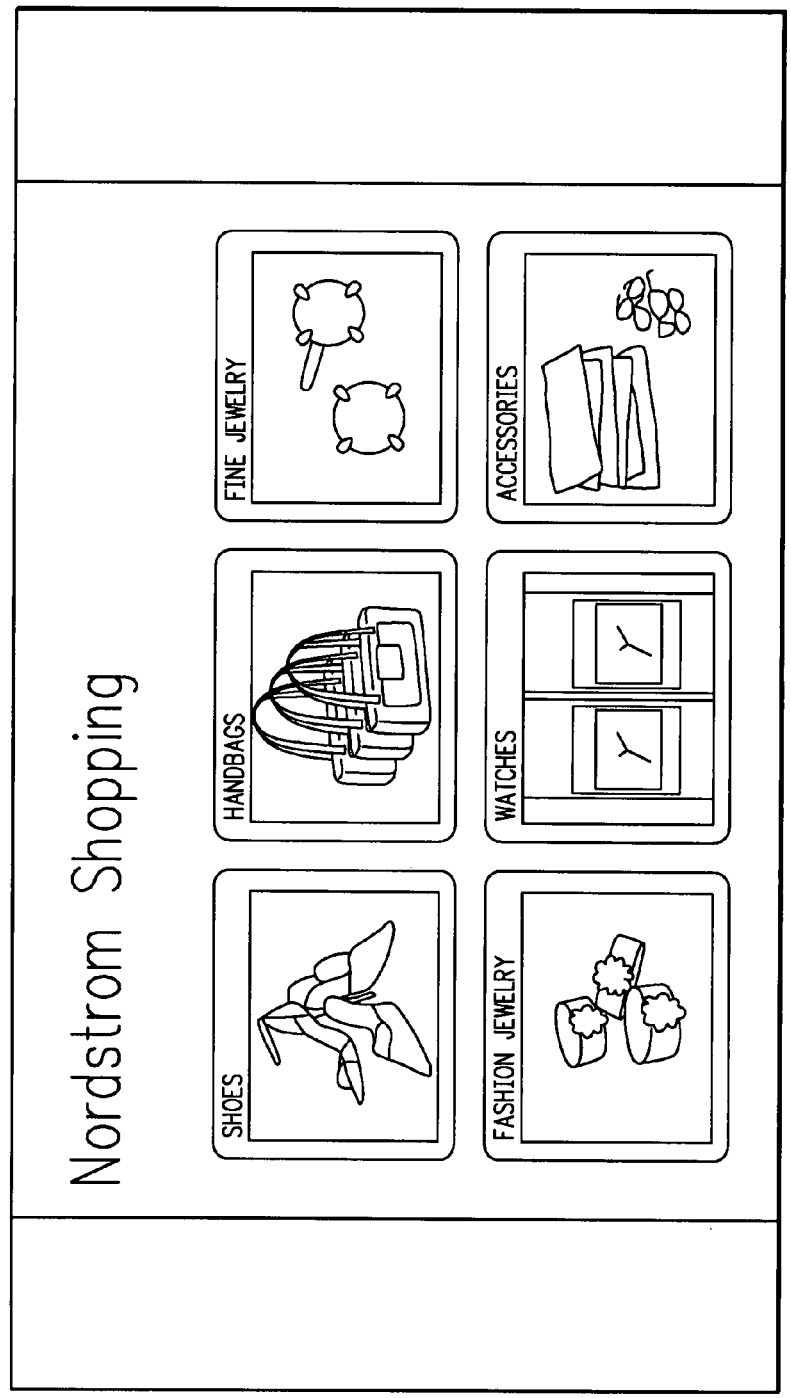
FIGS. 12(*a*)-12(*f*) illustrate scenes from a shopping application according to an exemplary embodiment of the present invention.
Figure 12B:
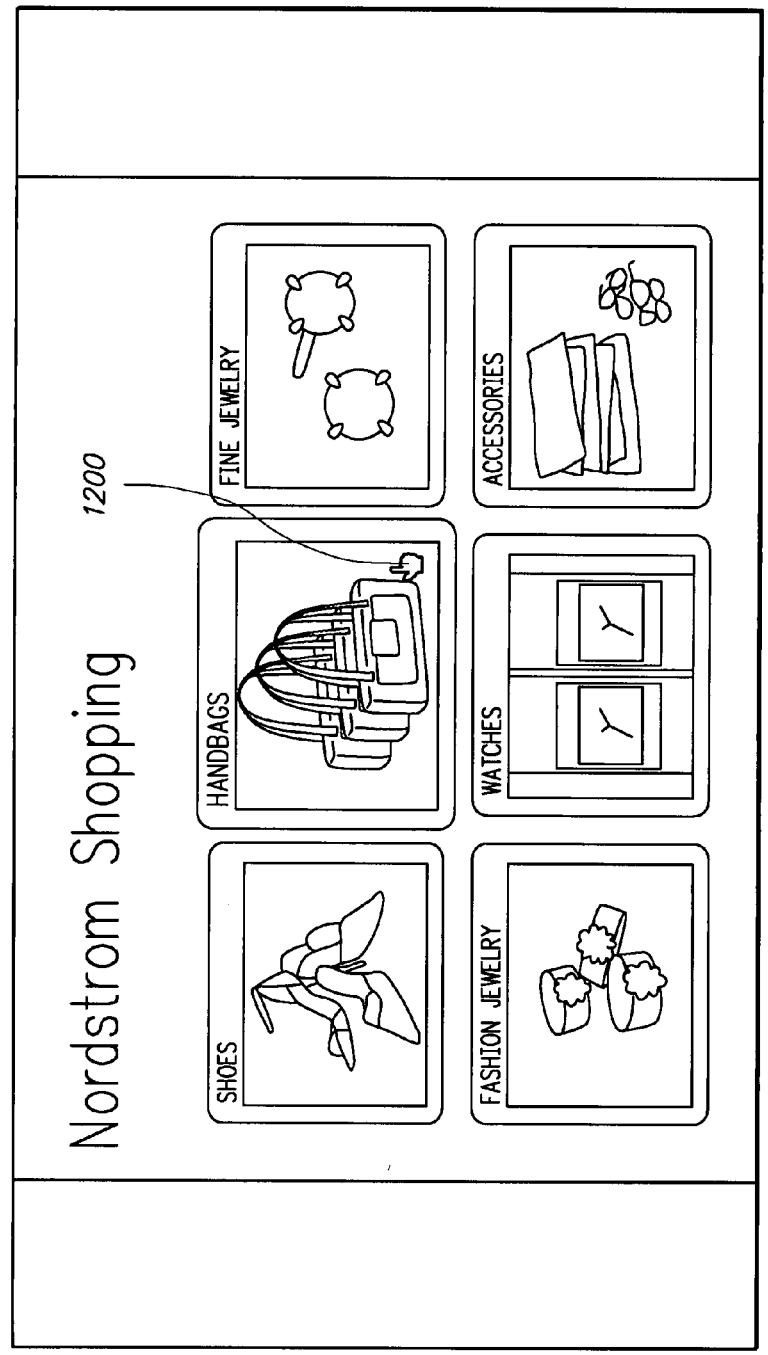
Figure 12C:
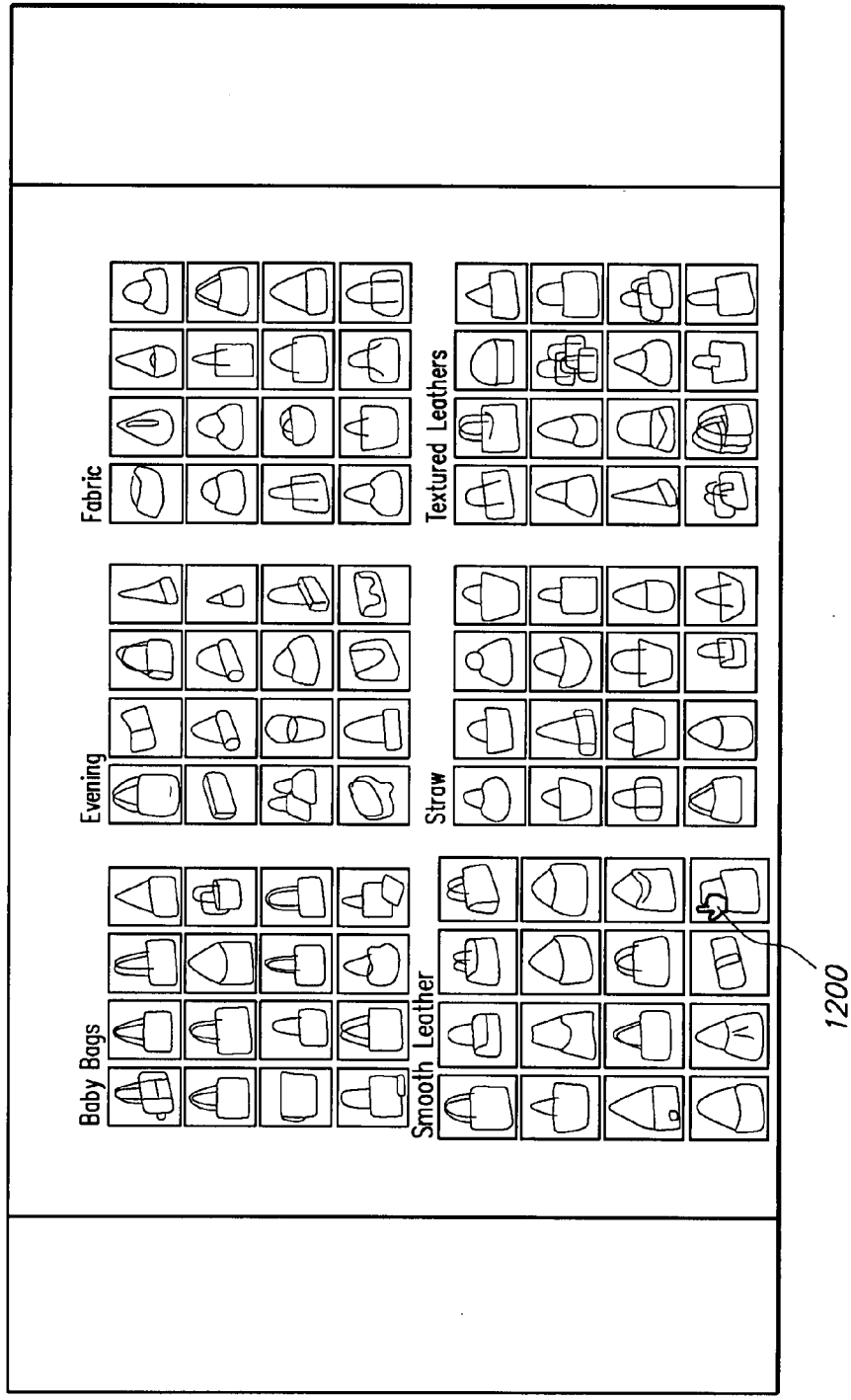
Figure 12D:
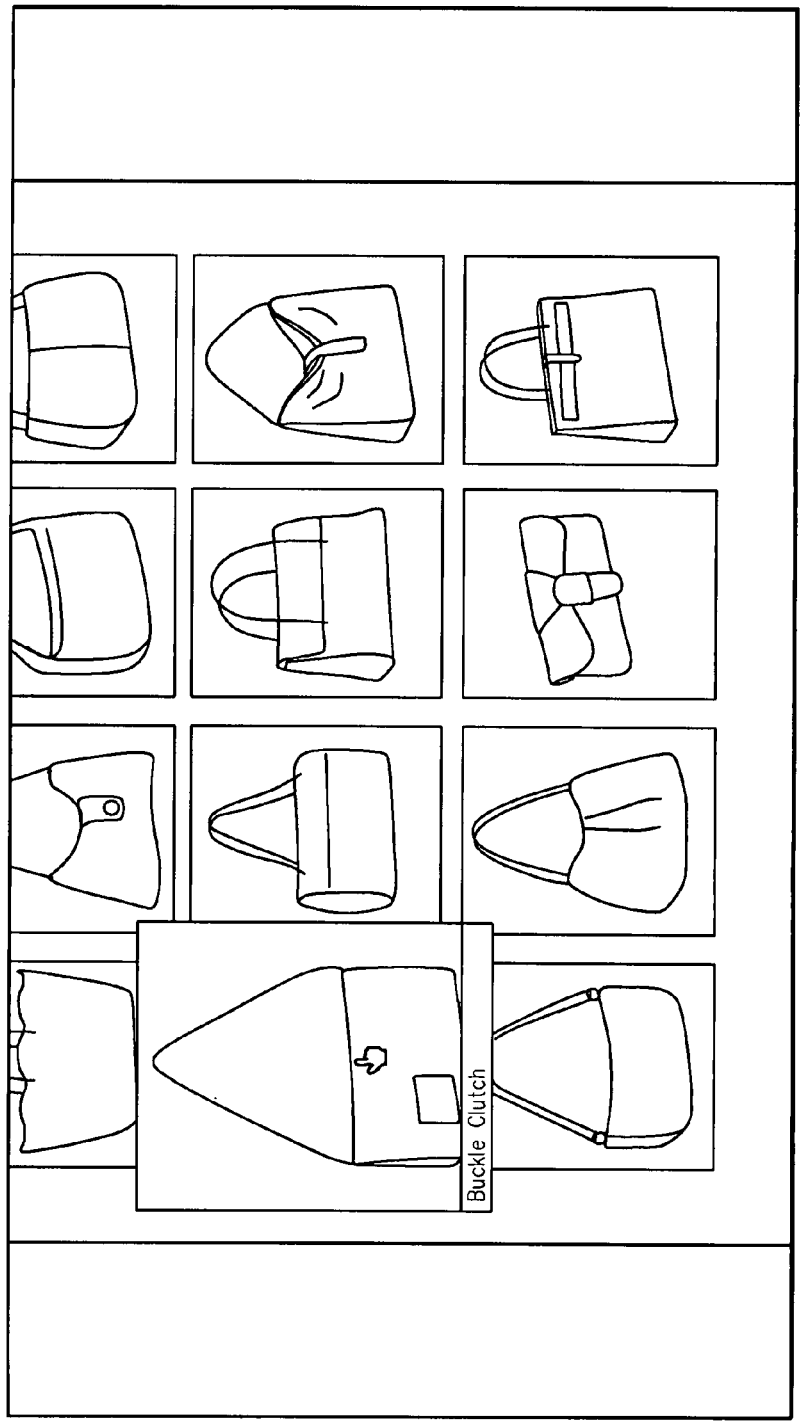

Running the exemplary shopping application, a user can point at a shopping items list or visual goods presentation and either automatically add it to a shopping cart or just buy it. For example, as illustrated in FIG. 12(a), at a first zoom level, a number of different categories of items for sale can be depicted on the TV (or other display) using some generic phrases and images. When a user pauses the cursor 1200 over a particular category, e.g., "Handbags" in FIG. 12(b), that image is magnified slightly to denote that it has the current focus. Then, either automatically or as a result of an additional user input (e.g., a button press), a zoom in can be performed on the "Handbag" category, revealing a bookshelf (visual directory) of handbags as shown in FIG. 12(c). Again, the cursor's position indicates a current selection within the bookshelf, reflected by the hoverzoom of the "Smooth Leather" category of items in FIG. 12(c). Another zoom in can be performed, again either automatically after an elapsed period of pointing at this category or in response to a specific user input via the handheld device, resulting in a more detailed view of this category as shown in FIG. 12(d). Selection of an image of particular handbag may result in a zoom in to the detailed view of FIG. 12(e), e.g., using the zooming, panning and/or translating effects described above.

Figure 12E:
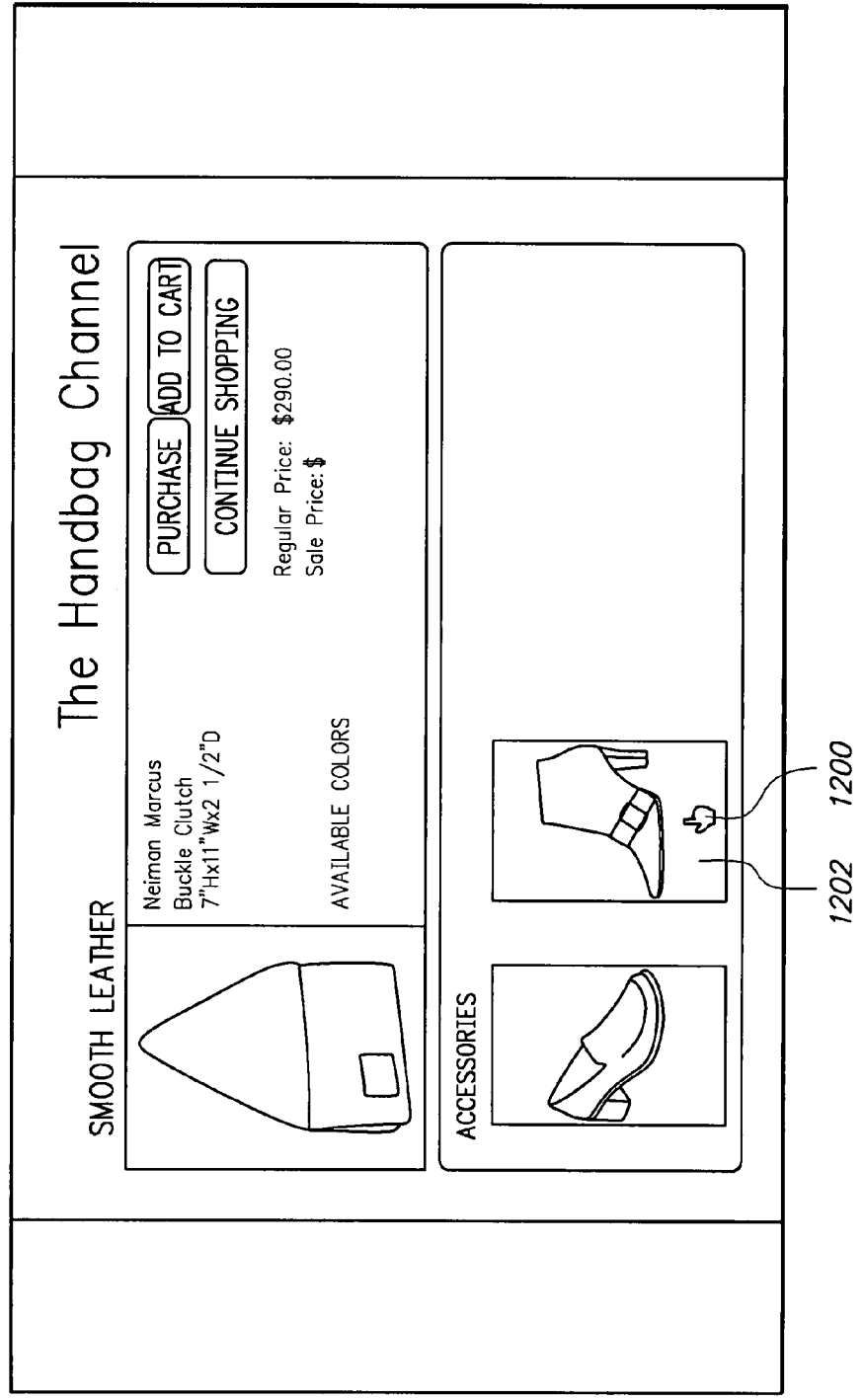
Figure 12F:
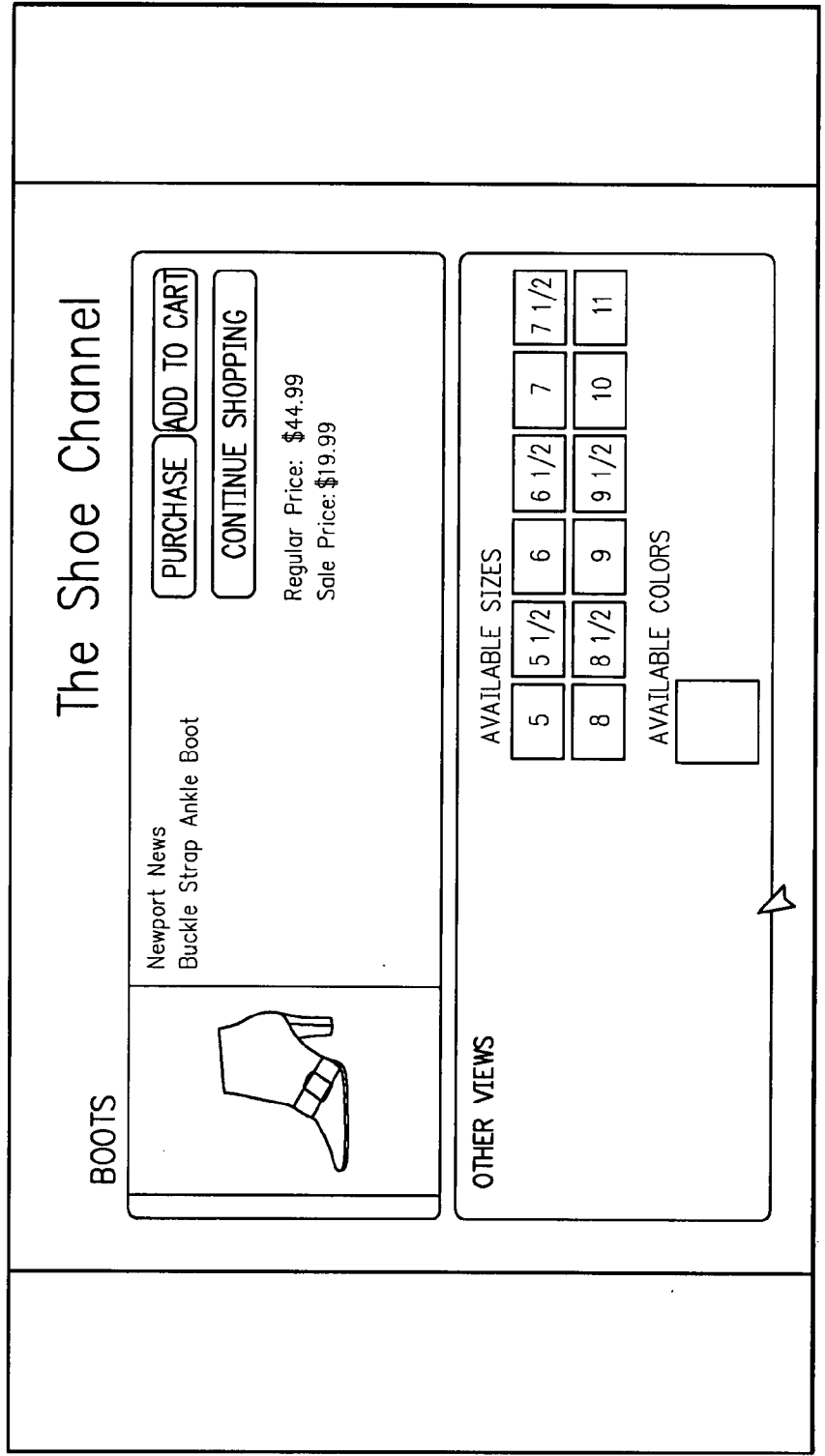

A user can easily navigate cross-links within this exemplary shopping application by pointing at the ones of interest (like other goods from same store, matching accessories, similar designers). For example, as shown in FIG. 12(e) a crosslink to a shoe accessory is displayed as an image 1202. If that link is activated, the user can jump to a detailed view of that item without having to navigate through the various higher level screens to reach it, as seen in FIG. 12(*f*).

One other component, in addition to the afore-described hardware/software architectures and applications, associated with multimedia systems according to these exemplary embodiments is the remote control device with which the user interacts with the various ZUI screens to select and consume content. Various references have been made to 3D pointing devices throughout this specification which are one example of a remote control device which can be used in conjunction with these architectures and applications. In addition to the above-incorporated by reference '663 patent application, the reader interested in more information related to exemplary 3D pointing devices which can be used in conjunction with these architectures and applications is also referred to U.S. patent application Ser. No. 11/480,662, entitled "3D Pointing Device", filed on Jul. 3, 2006, the disclosure of which is incorporated here by reference. However, the present invention is not limited to implementations including 3D pointing devices, but could also be used in conjunction with mice, joysticks, trackballs and other pointing devices.

The foregoing exemplary embodiments are purely illustrative in nature. The number of zoom levels, as well as the particular information and controls provided to the user at each level may be varied. Those skilled in the art will appreciate that the present invention provides techniques for presenting large and small sets of media items using a zoomable interface such that a user can easily search through, browse, organize and play back media items such as movies and music. Graphical user interfaces according to the present invention organize media item selections on a virtual surface such that similar selections are grouped together. Initially, the interface presents a zoomed out view of the surface, and in most cases, the actual selections will not be visible at this level, but rather only their group names. As the user zooms progressively inward, more details are revealed concerning the media item groups or selections. At each zoom level, different controls are available so that the user can play groups of selections, individual selections, or go to another part of the virtual surface to browse other related media items. Zooming graphical user interfaces according to exemplary embodiments of the present invention can contain categories of images nested to an arbitrary depth as well as categories of categories. The media items can include content which is stored locally, broadcast by a broadcast provider, received via a direct connection from a content provider or on a peering basis. The media items can be provided in a scheduling format wherein date/time information is provided at some level of the GUI. Additionally, frameworks and GUIs according to exemplary embodiments of the present invention can also be applied to television commerce wherein the items for selection are being sold to the user.

Zoomable user interfaces according to these exemplary embodiments employ various transition effects to instill a sense of spatial positioning within the ZUI "world" as a user navigates among content selections. These aspects of ZUIs are described in more detail in various ones of the above-incorporated by reference patent applications. Briefly, however, zooming refers to, for example, the progressive scaling of a displayed object, set of objects or a portion thereof that gives the visual impression of movement of all or part of such object(s) toward or away from an observer. In other words, the zooming feature, in some instances, causes the display of the object or objects to change from a distant view to a close view, and vice versa, as though the end user were manipulating a telescope, a magnifying glass, or a zoom lens of a camera. In other instances, semantic zooming may be employed to provide a similar progressive scaling on the display, yet adding or hiding details which would not necessarily be added or hidden when using a "pure" camera zoom. Similarly, a panning transition refers to the progressive translating of a displayed object, set of objects or a portion thereof that gives the visual impression of lateral movement of the object(s).

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

What is claimed is:

1. An electronic program guide (EPG) responsive to pointing inputs and having an integrated digital video recorder (DVR) function comprising:

a grid displayed on a first user interface screen, said grid having a plurality of program selections displayed therein as a zoomable visual directory of images associated with said plurality of program selections decreasing in numbers of said displayed plurality of program selections as said zoomable visual directory zooms in and increasing in numbers of said displayed plurality of program selections as said zoomable visual directory zooms out;

a cursor displayed as a moveable overlay on said grid, said cursor responsive to said pointing inputs to provide random access to said plurality of program selections; and wherein when a selection command is received by said EPG via said cursor displayed as said moveable overlay on said grid, a DVR control overlay is displayed on said grid, said DVR control overlay including one of buttons which, when actuated, causes said EPG to display a second user interface screen which shows previously recorded programs, further wherein the second user interface screen further comprises two tabs, one of which is associated with display of a visual directory of images of said previously recorded programs, and one of which is associated with display of a visual directory of images of programs scheduled to be recorded, and wherein a selection by said cursor of an image of said previously recorded programs causes said EPG to display a third user interface screen comprising two tabs, one of which is associated with display of a visual directory of previously recorded episodes of said selected image and one of which is associated with display of episodes to be recorded of said selected image.

2. The EPG of claim 1, wherein said DVR control overlay includes a record button.

3. The EPG of claim 1, wherein said grid includes a first axis grid corresponding to a plurality of channels and a second axis of grid corresponding to time.

4. The EPG of claim 1, wherein when said cursor is positioned over one of said plurality of program selections, a visual indication of focus is provided to said one of said plurality of program selections.

5. The EPG of claim 1, wherein each of said visual directory of images of said previously recorded programs and said visual directory of images of programs scheduled to be recorded include a plurality of images, wherein said plurality of images are arranged in a rectangular matrix with a first number of images in each row and a second number of images, different than said first number, in each column.

6. The EPG of claim 5, wherein each said visual directory includes a scroll bar for vertical scrolling of each said visual directory.

7. The EPG of claim 6, wherein said scroll bar is actuable via a scroll wheel of a remote control device.

8. The EPG of claim 1, further comprising:
a pair of arrow-shaped overlays superimposed on said grid which, when pointed to and actuated, scroll said EPG horizontally.

9. A scrollable visual directory display of images comprising:
a grid displayed on a first user interface screen, said grid having a plurality of selectable media item images, wherein said plurality of selectable media item images are arranged in a rectangular matrix with a first number of images in each row and a second number of images in each column, wherein said plurality of selectable media item images is at least one of a television program or a video on demand (VoD) program;
a cursor displayed as a moveable overlay on said grid, said cursor responsive to pointing inputs to provide random access to said plurality of selectable media item images; and
a scroll bar on one side of said plurality of selectable media item images for scrolling said rectangular matrix in opposite directions, along a row or a column,
wherein said cursor displayed as a moveable overlay on said grid is usable in conjunction with said scroll bar to scroll said plurality of selectable media item images,
wherein when one of said plurality of selectable media item images is selected by said cursor displayed as a moveable overlay on said grid, a second user interface screen is displayed,
further wherein said second user interface screen comprises two tabs, one of which is associated with display of a visual directory of images of previously recorded programs, and one of which is associated with display of a visual directory of images of programs scheduled to be recorded, and
wherein upon a selection by said cursor of an image of said previously recorded programs, a third user interface screen is displayed comprising two tabs, one of which is associated with display of a visual directory of previously recorded episodes of said selected image and one of which is associated with display of episodes to be recorded of said selected image,
further wherein said grid having said plurality of selectable media item images is displayed as a zoomable visual directory of images associated with said plurality of selectable media item images decreasing in numbers of said displayed plurality of selectable media item images as said zoomable visual directory zooms in and increasing in numbers of said displayed plurality of selectable media item images as said zoomable visual directory zooms out.

10. The scrollable visual directory of images of claim 9, wherein said scroll bar is on the left or right side of said rectangular matrix and is usable to vertically scroll said plurality of selectable media item images up and down.

11. The scrollable visual directory of images of claim 9, wherein said scroll bar is above or below said rectangular matrix and is usable to horizontally scroll said plurality of selectable media item images to the left and right.

12. A method for providing information in an electronic program guide (EPG) having an integrated digital video recorder (DVR) function comprising:
displaying a grid displayed on a first user interface screen, said grid having a plurality of program selections displayed therein as a zoomable visual directory of images with said plurality of program selections decreasing in numbers of said displayed plurality of program selections as said zoomable visual directory zooms in and increasing in numbers of said displayed plurality of program selections as said zoomable visual directory zooms out;
displaying a cursor as a moveable overlay on said grid, said cursor responsive to said pointing inputs to provide random access to said plurality of program selections; and
displaying, when a selection command is received by said EPG via said cursor displayed as said movable overlay on said grid, a DVR control overlay on said grid, said DVR control overlay including one of buttons which, when actuated, causes said EPG to display a second user interface screen which shows previously recorded programs,
wherein the second user interface screen further comprises two tabs, one of which is associated with display of a visual directory of images of said previously recorded programs, and one of which is associated with display of a visual directory of images of programs scheduled to be recorded, and
wherein a selection by said cursor of an image of said previously recorded programs causes said EPG to display a third user interface screen comprising two tabs, one of which is associated with display of a visual directory of previously recorded episodes of said selected image and one of which is associated with display of episodes to be recorded of said selected image.

13. The method of claim 12, wherein said DVR control overlay includes a record button.

14. The method of claim 12, wherein said grid includes a first axis grid corresponding to a plurality of channels and a second axis of grid corresponding to time.

15. The method of claim 12, further comprising providing, when said cursor is positioned over one of said plurality of program selections, a visual indication of focus to said one of said plurality of program selections.

16. The method of claim 12, wherein each of said visual directory of images of said previously recorded programs and said visual directory of images of programs scheduled to be recorded include a plurality of images, wherein said plurality of images are arranged in a rectangular matrix with a first number of images in each row and a second number of images, different than said first number, in each column.

17. The method of claim 16, wherein each said visual directory includes a scroll bar for vertical scrolling of each said visual directory.

18. The method of claim 17, wherein said scroll bar is actuable via a scroll wheel of a remote control device.

19. The method of claim 12, further comprising:
    displaying a pair of arrow-shaped overlays superimposed on said grid which, when pointed to and actuated, scroll said EPG horizontally.

* * * * *